United States Patent
Behzad et al.

(10) Patent No.: US 8,270,925 B2
(45) Date of Patent: Sep. 18, 2012

(54) EXTENDED ANTENNA MODULE AND APPLICATIONS THEREOF

(75) Inventors: Arya Reza Behzad, Poway, CA (US); Brima B. Ibrahim, Aliso Viejo, CA (US); John Walley, Ladera Ranch, CA (US); Vinko Erceg, Cardiff by the Sea, CA (US); Jeyhan Karaoguz, Irvine, CA (US); David Rosmann, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 530 days.

(21) Appl. No.: 12/328,613

(22) Filed: Dec. 4, 2008

(65) Prior Publication Data
US 2010/0144285 A1 Jun. 10, 2010

(51) Int. Cl.
*H04B 1/06* (2006.01)
*H04B 7/00* (2006.01)
(52) U.S. Cl. ...... 455/277.1; 455/78; 455/552.1
(58) Field of Classification Search ............ 455/277.1, 455/571, 78, 552.1
See application file for complete search history.

(56) References Cited

U.S. PATENT DOCUMENTS

| | | | | |
|---|---|---|---|---|
| 5,915,223 A * | 6/1999 | Lecuyer et al. | ............ | 455/552.1 |
| 6,609,010 B1 * | 8/2003 | Dolle et al. | ............... | 455/552.1 |
| 6,965,353 B2 * | 11/2005 | Shirosaka et al. | ........... | 343/802 |
| 7,050,018 B2 * | 5/2006 | Weit | ............................... | 343/876 |
| 2001/0051537 A1 * | 12/2001 | Nakamura et al. | ............. | 455/571 |
| 2002/0058488 A1 * | 5/2002 | Miyahara | ................... | 455/277.2 |
| 2002/0081987 A1 * | 6/2002 | Yoshida et al. | ............ | 455/277.1 |
| 2005/0095987 A1 * | 5/2005 | Lyons et al. | ................ | 455/67.13 |
| 2006/0172781 A1 * | 8/2006 | Mohebbi | ........................ | 455/571 |
| 2006/0193271 A1 * | 8/2006 | Proctor et al. | ................ | 370/294 |
| 2007/0184801 A1 * | 8/2007 | Kogawa et al. | ............ | 455/277.1 |
| 2008/0299896 A1 * | 12/2008 | Mohebbi | .......................... | 455/8 |
| 2009/0170461 A1 * | 7/2009 | Kwon et al. | ............... | 455/277.1 |

* cited by examiner

*Primary Examiner* — Quan Tra
(74) *Attorney, Agent, or Firm* — Garlick & Markison; Timothy W. Markison; Jessica W. Smith (57) ABSTRACT

An extended antenna module includes an antenna section and an extended wireless interface. The antenna section is operable to receive an inbound radio frequency (RF) signal when an antenna select signal is in a first state and/or transmit an outbound RF signal when the antenna select signal is in the first state. The extended wireless interface is operable to wirelessly receive the outbound RF signal from a unit wireless interface when the antenna select signal is in the first state and wirelessly transmit the inbound RF signal to the unit wireless interface when the antenna select signal is in the first state.

20 Claims, 8 Drawing Sheets

EXTENDED ANTENNA MODULE AND APPLICATIONS THEREOF

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

The present invention relates generally to wireless communication systems and more particularly to devices used within such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Since the wireless part of a wireless communication begins and ends with the antenna, a properly designed antenna structure is an important component of wireless communication devices. As is known, the antenna structure is designed to have a desired impedance (e.g., 50 Ohms) at an operating frequency, a desired bandwidth centered at the desired operating frequency, and a desired length (e.g., ¼ wavelength of the operating frequency for a monopole antenna). As is further known, the antenna structure may include a single monopole or dipole antenna, a diversity antenna structure, the same polarization, different polarization, and/or any number of other electromagnetic properties.

One popular antenna structure for RF transceivers is a three-dimensional in-air helix antenna, which resembles an expanded spring. The in-air helix antenna provides a magnetic omni-directional mono pole antenna, but is generally not implemented on a printed circuit board (PCB). For PCB implemented antennas, the antenna has a meandering pattern on one surface of the PCB. Such an antenna consumes a relatively large area of the PCB. For example, a ¼ wavelength antenna at 900 MHz has a total length of approximately 8 centimeters (i.e., 0.25*32 cm, which is the approximate wavelength of a 900 MHz signal). As another example, a ¼ wavelength antenna at 2400 MHz has a total length of approximately 3 cm (i.e., 0.25*12.5 cm, which is the approximate wavelength of a 2400 MH signal). Even with a tight meandering pattern, a single 900 MHz antenna consumes approximately 4 cm.

If an RF transceiver is a multiple band transceiver (e.g., 900 MHz and 2400 MHz) that supports multiple standards, then two antennas are needed, which consumes even more PCB space. With a never-ending push for smaller form factors with increased performance (e.g., multiple frequency band multiple standard [MFBMS] operation), current antenna structures are not practical for many newer wireless communication applications.

In addition, smaller form factor antennas, which operate at higher frequencies, are susceptible to varying signal strengths due to multi-path fading, interferers, and/or blocking signals. As such, as a device physically moves through an area (e.g., a room, a building, etc.), the signal strength and/or quality of a communication can vary significantly.

Therefore, a need exists for an antenna structure that at least partially overcomes one or more of the above mentioned limitations.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
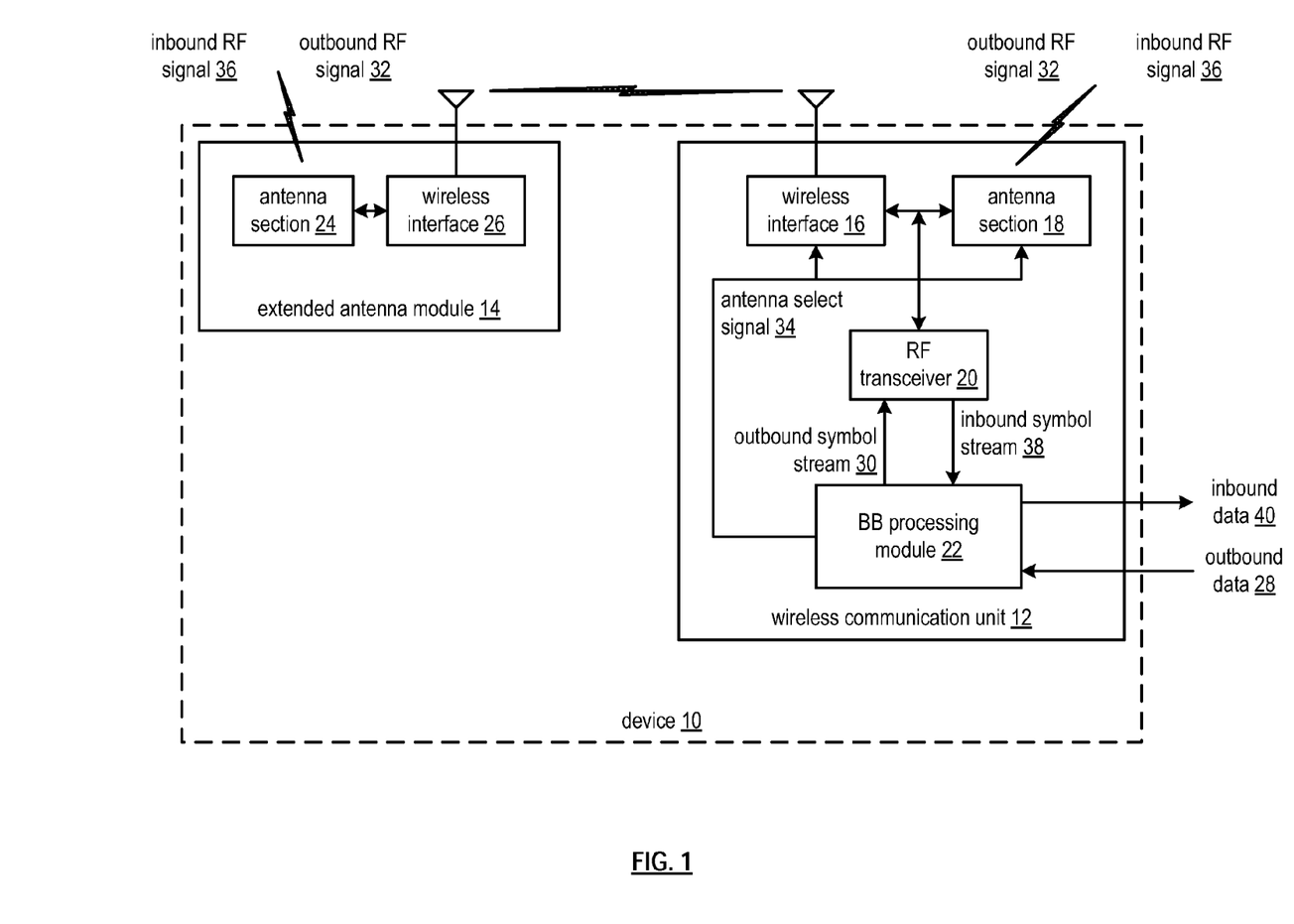
FIG. 1 is a schematic block diagram of an embodiment of a wireless communication device in accordance with the present invention.

FIG. 1 is a schematic block diagram of an embodiment of a wireless communication device 10 that includes a wireless communication unit 12 and an extended antenna module 14. The wireless communication unit 12, which may be a cell phone, a computer, a personal digital assistance, a digital camera, and/or any device that includes a radio frequency (RF) communication link, includes a wireless interface 16, an antenna section 18, an RF transceiver 20, and a baseband processing module 22. The extended antenna module 14 includes an antenna section 24 and a wireless interface 26.

The baseband processing module 22 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-9.

In an example of operation, the baseband processing module 22 generates an antenna selection signal 34, which it provides to the wireless interface 16 and the antenna section 18. In general, the antenna selection signal 34 indicates whether the wireless communication unit 12 will use the antenna section 18 and/or the extended antenna module 14 for participating in a wireless communication. For example, if the wireless communication unit 12 is participating in, or initiating, a wireless communication in accordance with a particular wireless standard (e,g., WCDMA), the baseband processing module 22 determines whether RF signals received and/or transmitted by the antenna section 18 of the unit 12 will provide a desired level of service (e.g., received signal strength, an error rate, etc.). If so, it generates the antenna section signal 34 in a second state such that signals are transceived via the antenna section 18 and the wireless interface 16 is inactive.

If the received RF signals and/or the transmitted RF signals are less than the desired level of service, the baseband processing module 22 generates the antenna select signal 34 in a first state. In this state, the antenna section 18 is inactive, or at least partially inactive, and the wireless interface 16 is active. Note that this determination assumes that the extended antenna module 14 will provide the desired level of service. In an alternate embodiment, the processing module 22 determines which antenna section 24 of the extended antenna module 14 or the antenna section 18 of the wireless communication unit 12, or portions thereof, will provide a better wireless connection (e.g., lower error rate) regardless of the level of service and generates the antenna select signal accordingly.

In another embodiment, the baseband processing module 22 may determine the state of the antenna selection signal 34 by determining signal properties (e.g., signal strength, error rate, transmit power requirements, signal to interference ratio, signal to noise ratio, etc.) of at least one of the inbound RF signal received by the unit antenna section and the outbound RF signal transmitted by the device antenna section. The determination may be done by one or more of a test signal, via history of use of the extended antenna module 14 versus the unit 12, and/or via sampling of the inbound RF signal and/or outbound RF signal. The determination may further be combined with known location of the unit 12 and/or the extended antenna module 14 for a given frequency band.

The baseband processing module then compares the signal properties with desired signal properties. When the signal properties compares unfavorably with the desired signal properties, the baseband processing module 22 generates the antenna select signal 34 in the first state.

In the first state, the wireless interface 16 of the wireless communication unit 12 wirelessly communicates with the wireless interface 26 of the extended antenna module 14. In this state, the antenna section is operable to receive an inbound radio frequency (RF) signal 36 and/or transmit an outbound RF signal 32. As such, the extended antenna module 14 may be used exclusively to transceive inbound and outbound RF signals for the wireless communication unit 12, for transmitting outbound RF signals 32, or for receiving inbound RF signals 36.

The extended wireless interface 26 is operable to wirelessly receive the outbound RF signal 32 from the wireless interface 16 and/or wirelessly transmit the inbound RF signal 36 to the wireless interface 16. In this instance, the wireless interfaces 16 and 26 set up a wireless link therebetween using a known protocol, or a proprietary protocol, to support the wireless conveyance of the inbound and outbound RF signals 32 and 36. Various embodiments of the wireless interfaces 16 and 26 will be described in greater detail with reference to FIGS. 4-6.

The wireless interface 16 provides the inbound RF signal 36 to the RF transceiver 20. A receiver section within the RF transceiver 20 converts the signal 36 into an inbound symbol stream 38. In an embodiment, the receiver section amplifies an inbound RF signal to produce an amplified inbound RF signal. The receiver section may then mix in-phase (I) and quadrature (Q) components of the amplified inbound RF signal with in-phase and quadrature components of a local oscillation to produce a mixed I signal and a mixed Q signal. The mixed I and Q signals are combined to produce an inbound symbol stream. In this embodiment, the inbound symbol may include phase information (e.g., +/−Δθ [phase shift] and/or θ(t) [phase modulation]) and/or frequency information (e.g., +/−Δf [frequency shift] and/or f(t) [frequency modulation]). In another embodiment and/or in furtherance of the preceding embodiment, the inbound RF signal includes amplitude information (e.g., +/−ΔA [amplitude shift] and/or A(t) [amplitude modulation]). To recover the amplitude information, the receiver section includes an amplitude detector such as an envelope detector, a low pass filter, etc.

The baseband processing module 22 converts the inbound symbol stream 38 into inbound data 40. The conversion may be done in accordance with one or more wireless communication standards (e.g., WCDMA, GSM, HSDPA, HSUPA, EDGE, GPRS, variations thereof, extensions thereof, and/or any other wireless communication protocol) and include one or more of digital intermediate frequency to baseband conversion, filtering, time to frequency domain conversion, constellation de-mapping, de-interleaving, decoding, and de-scrambling.

The baseband processing 22 also converts outbound data 28 (e.g., voice data, audio data, text data, video data, graphics data, etc.) into an outbound symbol stream 30 in accordance with the one or more wireless communication standards. The conversion may include one or more of scrambling, encoding, interleaving, constellation mapping, frequency to time domain conversion, filtering, and digital baseband to intermediate frequency conversion.

A transmitter section of the RF transceiver 20 converts the outbound symbol stream 30 into the outbound RF signal 32 that has a carrier frequency within a given frequency band (e.g., 900 MHz, 1800 MHz, 2.4 GHz, 5 GHz, 57-66 GHz, etc.). In an embodiment, this may be done by mixing the outbound symbol stream with a local oscillation to produce an up-converted signal. One or more power amplifiers and/or power amplifier drivers amplifies the up-converted signal, which may be RF bandpass filtered, to produce the outbound RF signal. In another embodiment, the transmitter section includes an oscillator that produces an oscillation. The outbound symbol stream provides phase information (e.g., +/−Δθ [phase shift] and/or θ(t) [phase modulation]) that adjusts the phase of the oscillation to produce a phase adjusted RF signal, which is transmitted as the outbound RF signal. In another embodiment, the outbound symbol stream includes amplitude information (e.g., A(t) [amplitude modulation]), which is used to adjust the amplitude of the phase adjusted RF signal to produce the outbound RF signal.

In yet another embodiment, the transmitter section includes an oscillator that produces an oscillation. The outbound symbol provides frequency information (e.g., +/−Δf [frequency shift] and/or f(t) [frequency modulation]) that adjusts the frequency of the oscillation to produce a frequency adjusted RF signal, which is transmitted as the outbound RF signal. In another embodiment, the outbound symbol stream includes amplitude information, which is used to adjust the amplitude of the frequency adjusted RF signal to produce the outbound RF signal. In a further embodiment, the transmitter section includes an oscillator that produces an oscillation. The outbound symbol provides amplitude information (e.g., +/−ΔA [amplitude shift] and/or A(t) [amplitude modulation]) that adjusts the amplitude of the oscillation to produce the outbound RF signal.

In the first state, the wireless interface 16 provides the outbound RF signal 32 to the wireless interface 26 of the extended antenna module 14, which is transmitted by the antenna section 24. Various embodiments of the antenna section 24 are described in greater detail with reference to FIGS. 2 and 3.

In an embodiment, when the antenna select signal is in the first state, the wireless interfaces 16 and 26 use one or more communication resources in a different frequency band than the frequency band of the communication resources for the inbound and outbound RF signals 32 and 36. In other words, the antenna section 24 of the extended antenna module 14 receives the inbound RF signal 36 having a carrier frequency in a first frequency band of a plurality of frequency bands and transmits the outbound RF signal 32 having a carrier frequency in the first frequency band. In addition, the extended wireless interface 26 wirelessly receives the outbound RF signal 32 from the unit wireless interface 16 via a wireless communication resource in a second frequency band of the plurality of frequency bands and wirelessly transmits the inbound RF signal to the unit wireless interface via a wireless communication resource in a second frequency band of the plurality of frequency bands. For example, the inbound and outbound RF signals may be in the 1800/1900 MHz frequency band and the 5 GHz frequency band is used for the wireless communication link between the wireless interfaces 16 and 26. In this example, the wireless interfaces 16 and 26 may include a WLAN transceiver, or portion thereof.

In an application, the extended antenna module 14 may be implemented in a package that is carried on the person operating the wireless communication unit 12. For example, the extended antenna module 14 may be placed in a shirt pocket, in a purse, etc. In another application, the extended antenna module may be mounted at a fixed location within the geographic space (e.g., a room) in which the wireless communication unit 12 is operating.

Figure 2:
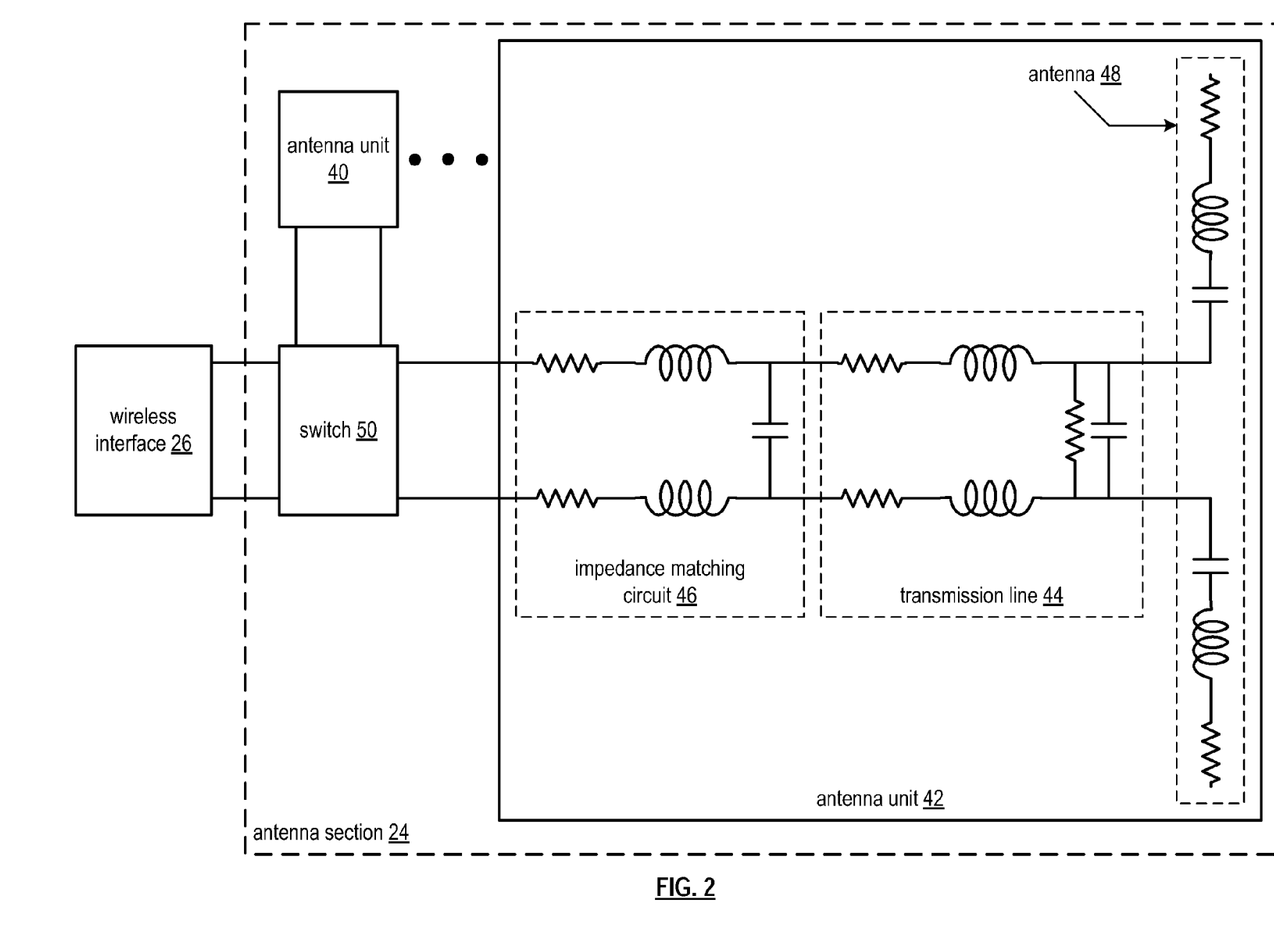
FIG. 2 is a schematic block diagram of an embodiment of an antenna section in accordance with the present invention.

FIG. 2 is a schematic block diagram of an embodiment of an antenna section 24 that includes a plurality of antenna units 40 and may further include an RF switch 50. Each of the antenna units 40 includes one or more antennas 48 and may further include one or more of a transmission line 44, an impedance matching circuit 46, and/or a transformer balun such that an antenna unit operates in a specific frequency band or portion thereof. For example, one or more antenna units 40 may include a transmit antenna and a receive antenna that operate in the 1800/1900 MHz frequency band, a second one or more antenna units 40 may include a shared transmit and receive antenna operating in the 2.4 GHz frequency band, etc.

The switch 50 couples one or more of the antenna units 40 to the wireless interface 26 in accordance with the antenna select signal 34. For example, the wireless unit 12 may communicate an antenna configuration to the extended antenna module 14 via the wireless communication link between the wireless interfaces 16 and 26. The wireless interface 26 recovers antenna configuration information and provides it to the antenna section 24 such that it is configured in accordance with the particular mode of the wireless communication unit 12. The antenna configuration may include an antenna array, a diversity antenna structure, a dipole antenna structure, a mono pole antenna structure, etc.

Figure 3:
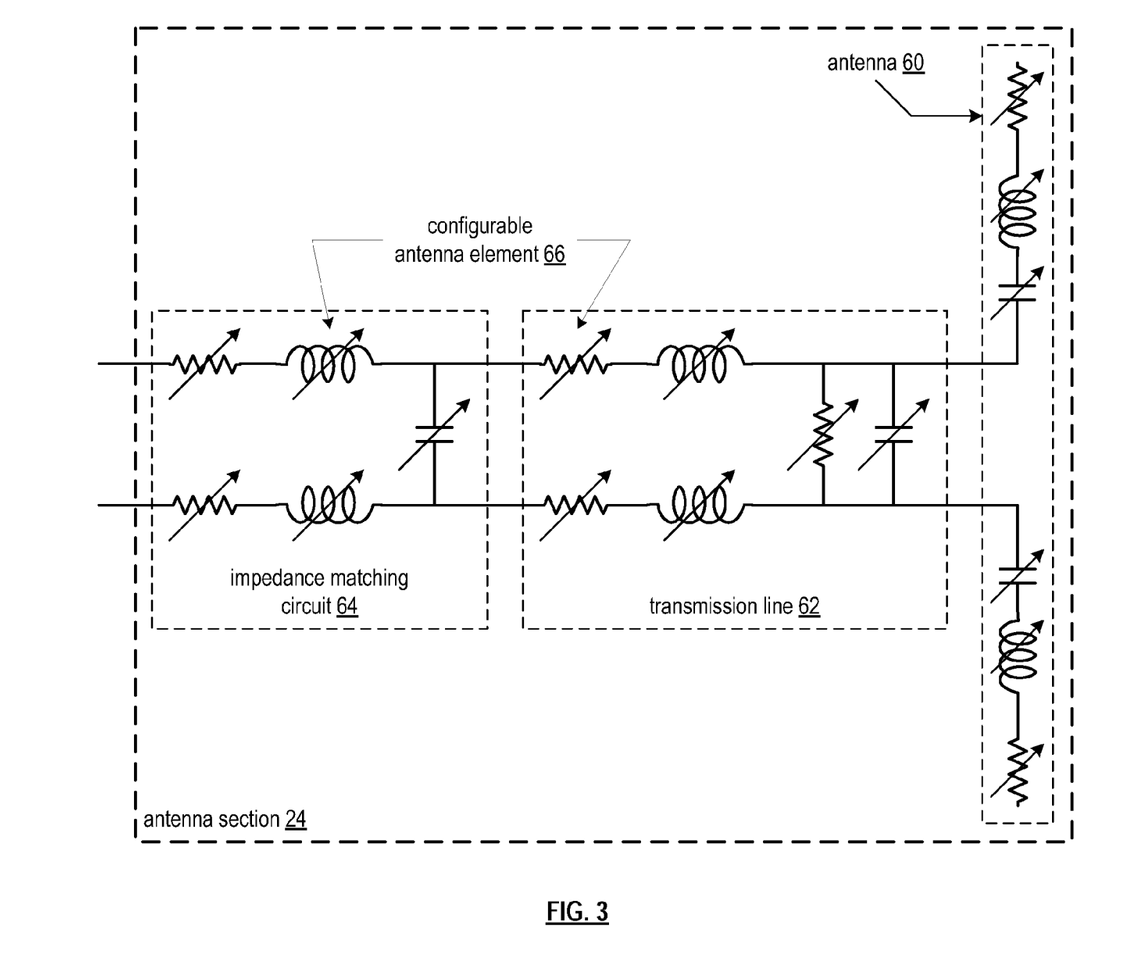
FIG. 3 is a schematic block diagram of another embodiment of an antenna section in accordance with the present invention.

FIG. 3 is a schematic block diagram of another embodiment of an antenna section 24 that includes a plurality of configurable antenna elements 66. At least some of the antenna elements 66 may be configured into one or more antenna units. An antenna unit may include one or more antennas 60 having antenna properties for operation in a specific frequency band and may include an impedance matching circuit 64, a transmission line 62, and/or a transformer balun. As shown, the configurable antenna elements 66 are adjustable, which be implemented as a variable resistors, variable inductors, and/or variable capacitors. Alternatively, or in addition to, the configurable antenna elements 66 may be implemented using a selectable resistor network, a selectable capacitor network, and/or a selectable inductor network. Note that a transistor may be used t implement a resistor and/or a capacitor. Further note that the antenna 60 may be implemented using one or more antenna segments, where each antenna segment has associated antenna properties. As such, when antenna segments are combined in a particular manner, the resulting antenna has desired antenna properties.

Figure 4:
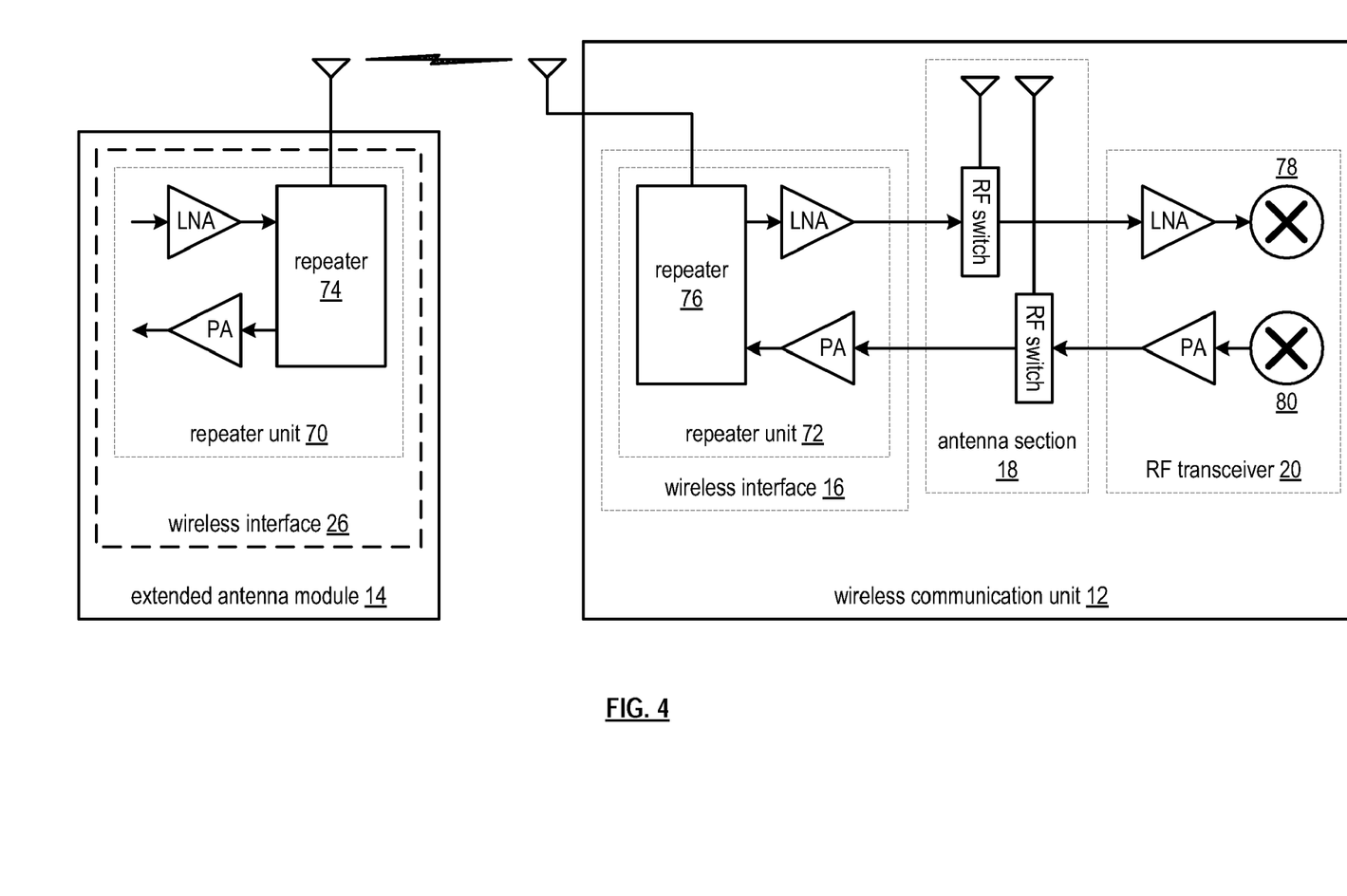
FIG. 4 is a schematic block diagram of an embodiment of an extended antenna section and wireless communication unit in accordance with the present invention.

FIG. 4 is a schematic block diagram of an embodiment of an extended antenna module 14 and a wireless communication unit 12. The wireless communication unit 12 includes the wireless interface 16, the antenna section 18, and the RF transceiver 20. The wireless interface 16 includes a repeater unit 72 that includes a repeater 76, a low noise amplifier (LNA) and a power amplifier (PA). The antenna section 18 includes a plurality of antennas and a plurality of RF switches. The RF transceiver includes an LNA, a PA, a down converter 78, and an up-converter 80. The extended antenna module 14 includes the wireless interface 26, which, in turn, includes a repeater unit 70. The repeater unit 70 includes a repeater 74, a low noise amplifier (LNA) and a power amplifier (PA).

When the antenna section signal 34 is in the first state, the RF switches couple the LNA of the RF transceiver 20 to the LNA Of the repeater unit 72 and couples the PA of the RF transceiver 20 to the PA of the repeater unit 72. Note that the repeater unit 72 may be implemented without the LNA and/or without the PA. In this state, the repeater 76 repeats the outbound RF signal to the repeater 74 of the extended antenna module 14 and the repeater 74 repeats the inbound RF signal to the repeater 76 of the wireless communication unit 12.

In an alternate embodiment, the repeater unit 72 within the wireless communication unit 12 may be omitted and the transmit power of the wireless communication unit 12 reduced such that it has just enough range to transmit to the repeater unit of the extended unit 14. In this instance, the wireless communication unit 12 may include signal processing to adjust for delays in the inbound signal received via the antenna section 18 and the from the extended antenna unit 14. Alternatively or in addition to, the wireless communication unit 12 may include beamforming on the receive side such that the radiation pattern of the receive antenna of the antenna section 18 is directed towards the extended antenna unit 14.

Figure 5:
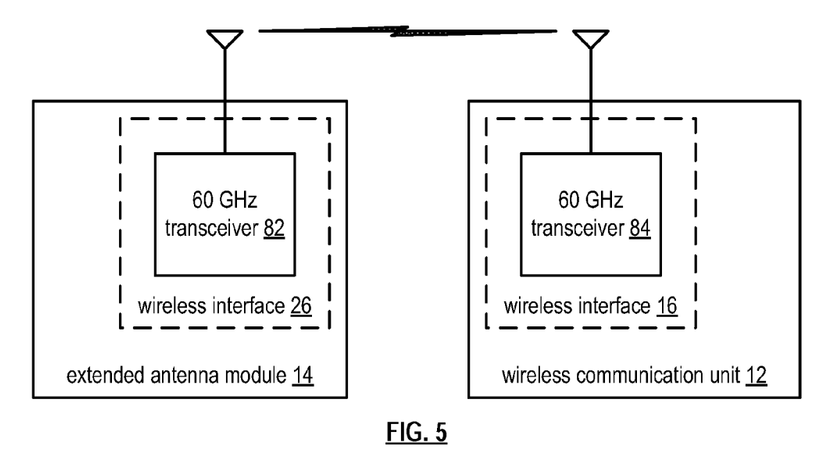
FIG. 5 is a schematic block diagram of another embodiment of an extended antenna section and wireless communication unit in accordance with the present invention.

FIG. 5 is a schematic block diagram of another embodiment of the extended antenna section 14 and the wireless communication unit 12, wherein the respective wireless interfaces 16 and 26 each include a 60 GHz transceiver. In this embodiment, the wireless communication unit 12 conveys the outbound symbol stream to the 60 GHz transceiver 84 that converts the symbol stream into a 60 GHz outbound signal. Alternatively, the 60 GHz transceiver 84 may up convert the outbound RF signal into the 60 GHz outbound signal. In either case, the 60 GHz transceiver 82 down converts the 60 GHz outbound signal into the outbound RF signal 32, which is transmitted via the antenna section 24.

Similarly, the 60 GHz transceiver 82 up converts the inbound RF signal 38 into a 60 GHz inbound signal, which it transmits to the 60 GHz transcevier 84. The 60 GHz transceiver 84 down converts the 60 GHz inbound signal into the inbound RF signal 36 or into the inbound symbol stream.

Figure 6:
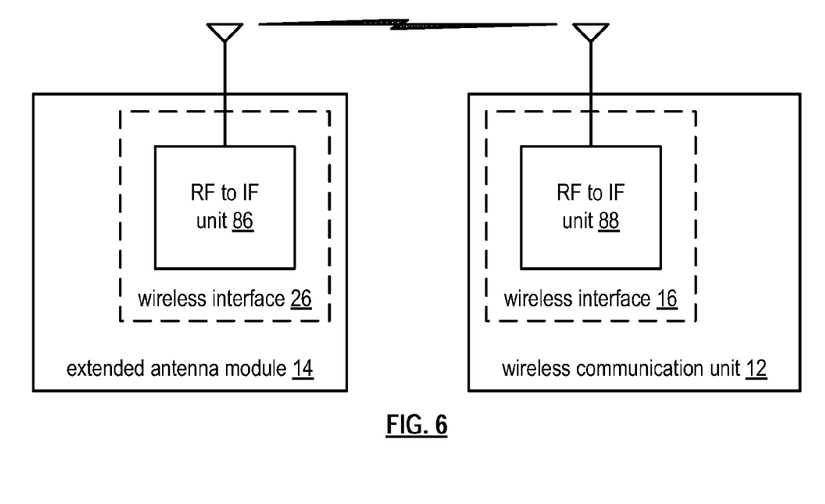
FIG. 6 is a schematic block diagram of another embodiment of an extended antenna section and wireless communication unit in accordance with the present invention.

FIG. 6 is a schematic block diagram of another embodiment of the extended antenna section 14 and the wireless communication unit 12, wherein the respective wireless interfaces 16 and 26 each include an RF to intermediate frequency (IF) unit 88. In this embodiment, the wireless communication unit 12 conveys an outbound IF signal to the RF to IF unit 88, which converts the outbound IF signal into the outbound RF signal 32. Alternatively, the RF to IF unit 88 may up convert the outbound RF signal into a higher frequency outbound RF signal. In the former case, the RF to IF unit 86 passes the outbound RF signal 32 to the antenna section 24. In latter case, the RF to IF unit 86 down converts the high frequency outbound RF signal (e.g., in the 5 GHz frequency band) into the outbound RF signal 32 (e.g., in the 2.4 GHz frequency band).

Similarly, the RF to IF unit 86 up converts the inbound RF signal 38 into a higher frequency inbound signal, which it transmits to the RF to IF unit 88. The RF to IF unit 88 down converts the higher frequency inbound signal into the inbound RF signal 36. As a similar alternative, the RF to IF unit 86 passes the inbound RF signal 38 to the RF to IF unit 88, which down converts it into an IF signal.

Figure 7:
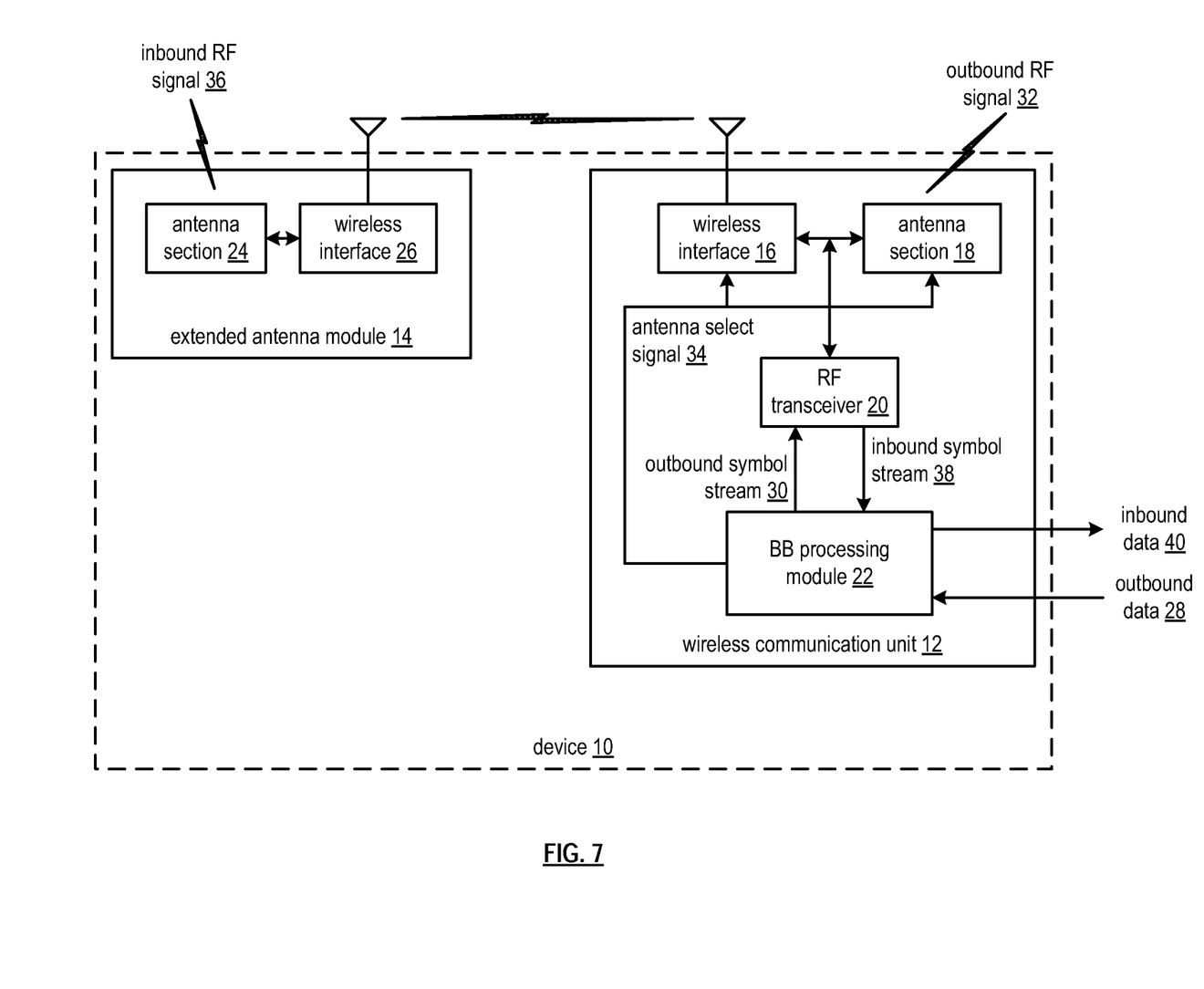
FIG. 7 is a schematic block diagram of another embodiment of a wireless communication device in accordance with the present invention.

FIG. 7 is a schematic block diagram of another embodiment of a wireless communication device 10 that includes a wireless communication unit 12 and an extended antenna module 14. The wireless communication unit 12, which may be a cell phone, a computer, a personal digital assistance, a digital camera, and/or any device that includes a radio frequency (RF) communication link, includes a wireless interface 16, an antenna section 18, an RF transceiver 20, and a baseband processing module 22. The extended antenna module 14 includes an antenna section 24 and a wireless interface 26.

In this embodiment, the baseband processing module 22 generates the antenna select signal 34 in a third state. In this state, inbound RF signals 36 are received via the extended antenna module 14 and the outbound RF signals 32 are transmitted via the antenna section 18. As such, the antenna section 24 is operable for receiving the inbound RF signal 36 and the extended wireless interface 26 is operable for wirelessly transmitting the inbound RF signal 36 to the device wireless interface 16. The unit wireless interface is operable for wirelessly receiving the inbound RF signal 36 from the extended wireless interface 26 and the unit antenna section 18 is operable for transmitting the outbound RF signal 32.

Figure 8:
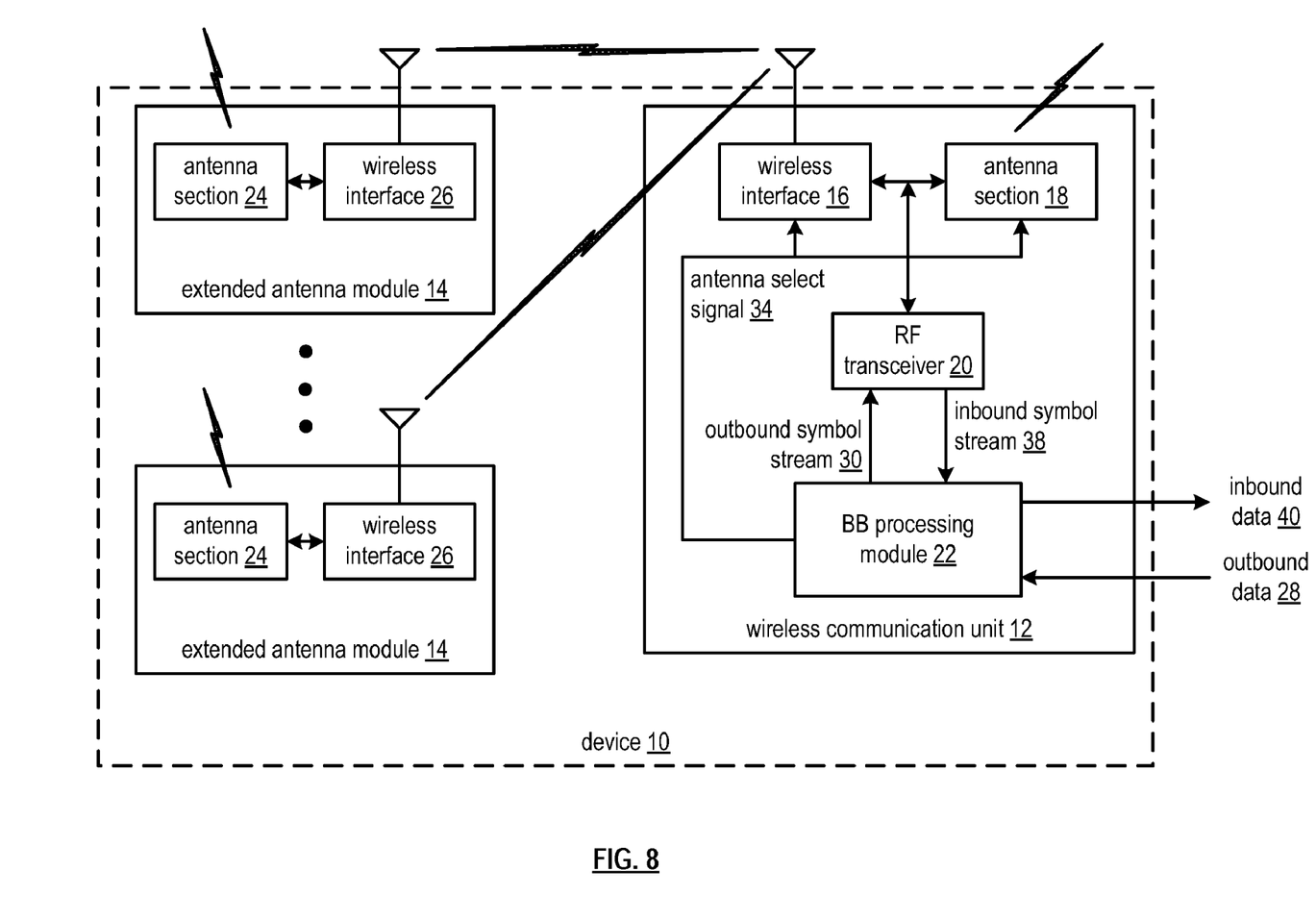
FIG. 8 is a schematic block diagram of another embodiment of a wireless communication device in accordance with the present invention.

FIG. 8 is a schematic block diagram of another embodiment of a wireless communication device 10 that includes the wireless communication unit 12 and a plurality of extended antenna modules 14. The wireless communication unit 12, which may be a cell phone, a computer, a personal digital assistance, a digital camera, and/or any device that includes a radio frequency (RF) communication link, includes a wireless interface 16, an antenna section 18, an RF transceiver 20, and a baseband processing module 22. Each of the extended antenna module 14 includes an antenna section 24 and a wireless interface 26.

In this embodiment, the wherein the baseband processing module 22 generates one or more of a plurality of antenna select signals 34 to select one or more of the plurality of extended antenna modules 14. As such, the device 10 may use multiple extended antenna modules 14 in an array pattern, as a diversity antenna structure, in a multiple input multiple output (MIMO), manner etc. Further, the wireless communication unit 12 has the ability to select one or more of the extended antennas modules 14 to provide a desired level of service.

Figure 9:
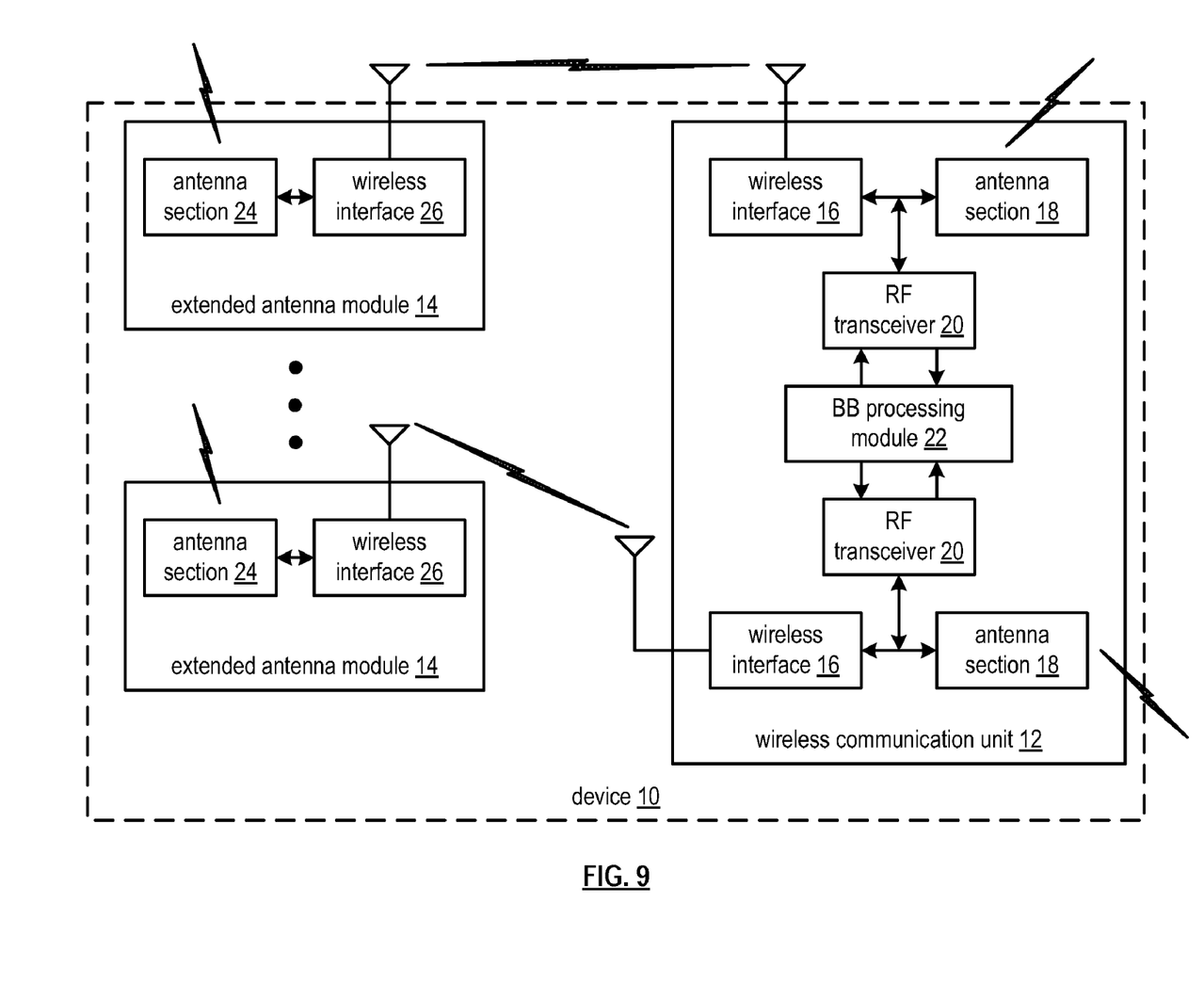
FIG. 9 is a schematic block diagram of another embodiment of a wireless communication device in accordance with the present invention.

FIG. 9 is a schematic block diagram of another embodiment of a wireless communication device 10 that includes the wireless communication unit 12 and a plurality of extended antenna modules 14. The wireless communication unit 12, which may be a cell phone, a computer, a personal digital assistance, a digital camera, and/or any device that includes a radio frequency (RF) communication link, includes a plurality of wireless interfaces 16, a plurality of antenna sections 18, a plurality of RF transceivers 20, and at least one baseband processing module 22. Each of the extended antenna module 14 includes an antenna section 24 and a wireless interface 26.

In this embodiment, one RF transceiver 20 is tuned for use within a given frequency band (e.g., 900 MHz, 1800 MHz, 2.4 GHz, 5 GHz, 29 GHz, 60 GHz, etc.) and at least one other RF transceiver 20 is tuned for use within another frequency band. In this instance, the wireless device 12 may be active in multiple wireless communications in different frequency band that are compliant with different standards. For each wireless communication, the antenna section 18 or the extended antenna module 14 is used as previously described. Thus, one or more wireless communications can be enhanced (e.g., better quality of service) via use of one or more extended antenna modules 14.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A device comprises:
   an extended antenna module that includes:
      an antenna section operable for:
         receiving an inbound radio frequency (RF) signal in a first frequency band when an antenna select signal is in a first state; and
         transmitting an outbound RF signal in the first frequency band when the antenna select signal is in the first state;
      an extended wireless interface operable for:
         wirelessly receiving the outbound RF signal in a second frequency band from a unit wireless interface when the antenna select signal is in the first state; and
         wirelessly transmitting the inbound RF signal in the second frequency band to the unit wireless interface when the antenna select signal is in the first state; and
   a wireless communication unit that includes:
      the unit wireless interface operable for:
         wirelessly transmitting the outbound RF signal in the second frequency band to the extended wireless interface when the antenna select signal is in a first state; and wirelessly receiving the inbound RF signal in the second frequency band from the extended wireless interface when the antenna select signal is in the first state;

a unit antenna section operable for:
  transmitting the outbound RF signal in the first frequency band when the antenna select signal is in a second state; and
  receiving the inbound RF signal in the first frequency band when the antenna select signal is in the second state;

a radio frequency transceiver operable for:
  converting the inbound RF signal into the inbound symbol stream; and
  converting an outbound symbol stream into the outbound RF signal; and a baseband processing module operable for:
  determining signal properties of the inbound RF signal received by the unit antenna section;
  comparing the signal properties with desired signal properties;
  when the signal properties compare unfavorably with the desired signal properties, generating the first state of the antenna select signal; and
  when the signal properties compare favorably with the desired signal properties, generating the second state of the antenna select signal.

2. The device of claim 1, wherein the antenna section comprises:
  a plurality of antenna units, wherein an antenna unit includes one or more antennas having antenna properties for operation in a specific frequency band of a plurality of frequency bands, wherein the antenna unit includes one or more of a transmission line, an impedance matching circuit, and a transformer balun, and wherein selection of one of the plurality of antenna units is in accordance with a frequency band selection portion of the antenna select signal.

3. The device of claim 1, wherein the antenna section comprises:
  a plurality of configurable antenna elements, wherein at least some of the plurality of antenna elements are configured into one or more antenna units, wherein an antenna unit of the one or more antenna units includes one or more antennas having antenna properties for operation in a specific frequency band of a plurality of frequency bands, wherein the antenna unit includes one or more of a transmission line, an impedance matching circuit, and a transformer balun, and wherein configuring the at least some of the plurality of antenna elements is in accordance with a frequency band selection portion of the antenna select signal.

4. The device of claim 2 further comprises when the antenna select signal is in the first state:
  the antenna section operable for:
    receiving the inbound RF signal having a carrier frequency in the first frequency band of the plurality of frequency bands; and
    transmitting the outbound RF signal having the carrier frequency in the first frequency band of the plurality of frequency bands;
  the extended wireless interface operable for:
    wirelessly receiving the outbound RF signal from the unit wireless interface via a wireless communication resource in the second frequency band of the plurality of frequency bands; and
    wirelessly transmitting the inbound RF signal to the unit wireless interface via a wireless communication resource in the second frequency band of the plurality of frequency bands.

5. The device of claim 1 further comprises:
  the extended wireless interface includes a first 60 GHz transceiver; and
  the unit wireless interface includes a second 60 GHz transceiver.

6. The device of claim 1 further comprises:
  the extended wireless interface includes a first repeater unit; and
  the unit wireless interface includes a second repeater unit.

7. The device of claim 1 further comprises:
  the extended wireless interface includes a first RF to intermediate frequency (IF) unit; and
  the unit wireless interface includes a second RF to IF unit.

8. The device of claim 1, wherein the baseband processing module is further operable to:
  determine signal properties of the outbound RF signal transmitted by the unit antenna section;
  compare the signal properties with desired signal properties; and
  when the signal properties compares unfavorably with the desired signal properties, generate the first state of the antenna select signal.

9. The device of claim 1 further comprises:
  the baseband processing module generating the antenna select signal in a third state;
  the antenna section operable for:
    receiving the inbound RF signal in the first frequency band; and
  the extended wireless interface operable for:
    wirelessly transmitting the inbound RF signal to the unit wireless interface in the second frequency band; and
  the unit wireless interface operable for:
    wirelessly receiving the inbound RF signal from the extended wireless interface in the second frequency band; and
  the unit antenna section operable for:
    transmitting the outbound RF signal in the first frequency band.

10. The device of claim 1 further comprises:
  a plurality of extended antenna modules that includes the extended antenna module; and
  wherein the baseband processing module generates one or more of a plurality of antenna select signals to select one or more of the plurality of extended antenna modules, wherein the plurality of antenna select signals includes the antenna select signal.

11. An extended antenna module comprises:
  an antenna section including a plurality of antenna units, wherein an antenna unit includes one or more antennas having antenna properties for operation in at least one frequency band of a plurality of frequency bands, and wherein selection of one of the plurality of antenna units is in accordance with a frequency band selection portion of an antenna select signal, and wherein the antenna section is operable for:
    receiving an inbound radio frequency (RF) signal in a first frequency band of the plurality of frequency bands by one of the plurality of antenna units when an antenna select signal is in a first state, wherein the one of the plurality of antenna units is selected in response to the frequency band selection portion of the antenna select signal; and transmitting an outbound RF signal in the first frequency band of the plurality of first frequency bands by the one of the plurality of antenna units when the antenna select signal is in the first state; and an extended wireless interface operable for:
    wirelessly receiving the outbound RF signal in a second frequency band of the plurality of frequency bands from a unit wireless interface when the antenna select signal is in the first state;
    wirelessly transmitting the inbound RF signal in the second frequency band to the unit wireless interface when the antenna select signal is in the first state; and
    wherein the extended wireless interface wirelessly receives the antenna select signal from the unit wireless interface.

12. The extended antenna module of claim 11, wherein the antenna unit includes one or more of a transmission line, an impedance matching circuit, and a transformer balun.

13. The extended antenna module of claim 11, wherein the antenna section comprises:
    a plurality of configurable antenna elements, wherein at least some of the plurality of antenna elements are configured into the plurality of antenna units, wherein the antenna unit includes one or more of a transmission line, an impedance matching circuit, and a transformer balun.

14. The extended antenna module of claim 11, wherein the extended wireless interface comprises:
    a 60 GHz transceiver, wherein the second frequency band of the plurality of frequency bands is in a 60 GHz frequency band.

15. A wireless communication unit comprises:
    a unit wireless interface operable for at least one of:
        wirelessly transmitting an outbound radio frequency (RF) signal in a first frequency band to an extended wireless interface when an antenna select signal is in a first state for transmission by the extended wireless interface in a second frequency band; and
        wirelessly receiving an inbound RF signal in the first frequency band from the extended wireless interface when the antenna select signal is in the first state, wherein the extended wireless interface received the inbound RF signal in the second frequency band;
    a unit antenna section operable for at least one of:
        transmitting the outbound RF signal in the second frequency band when the antenna select signal is in a second state; and
        receiving the inbound RF signal in the second frequency band when the antenna select signal is in the second state;
    a radio frequency transceiver operable for at least one of:
        converting the inbound RF signal into the inbound symbol stream; and
        converting an outbound symbol stream into the outbound RF signal; and
    a baseband processing module operable for:
        determining signal properties of the inbound RF signal in the first frequency band received by the unit antenna section;
        comparing the signal properties of the inbound RF signal with desired signal properties;
        when the signal properties of the inbound RF signal compare unfavorably with the desired signal properties, generating the first state of the antenna select signal; and
        when the signal properties of the inbound RF signal compare favorably with the desired signal properties, generating the second state of the antenna select signal.

16. The wireless communication unit of claim 15 further comprises when the antenna select signal is in the first state:
    the unit antenna section operable for:
        receiving the inbound RF signal having a carrier frequency in a first frequency band of a plurality of frequency bands; and
        transmitting the outbound RF signal having the carrier frequency in the first frequency band; and
    the unit wireless interface operable for:
        wirelessly receiving the outbound RF signal from the extended wireless interface via a wireless communication resource in a second frequency band of the plurality of frequency bands; and
        wirelessly transmitting the inbound RF signal to the extended wireless interface via a wireless communication resource in the second frequency band of the plurality of frequency bands.

17. The wireless communication unit of claim 15, wherein the unit wireless interface comprises:
    a 60 GHz transceiver, wherein the second frequency band of the plurality of frequency bands is in a 60 GHz frequency band.

18. The wireless communication unit of claim 15, wherein the baseband processing module is further operable to:
    determine signal properties of the outbound RF signal transmitted by the unit antenna section;
    compare the signal properties with desired signal properties; and
    when the signal properties compares unfavorably with the desired signal properties, generate the first state of the antenna select signal.

19. The wireless communication unit of claim 15 further comprises:
    the baseband processing module generating the antenna select signal in a third state;
    the unit wireless interface operable for:
        wirelessly receiving the inbound RF signal from the extended wireless interface; and
    the unit antenna section operable for:
        transmitting the outbound RF signal.

20. The wireless communication unit of claim 15 further comprises:
    a plurality of extended antenna modules that includes the extended antenna module; and
    wherein the baseband processing module is further operable to generate an antenna configuration signal to select one or more of the plurality of extended antenna modules, wherein the antenna select signal includes the antenna configuration signal.

* * * * *